No. 659,057. Patented Oct. 2, 1900.
J. DOYLE.
SERVING APPARATUS FOR DINING ROOMS.
(Application filed Dec. 15, 1898.)
(No Model.) 3 Sheets—Sheet 2.
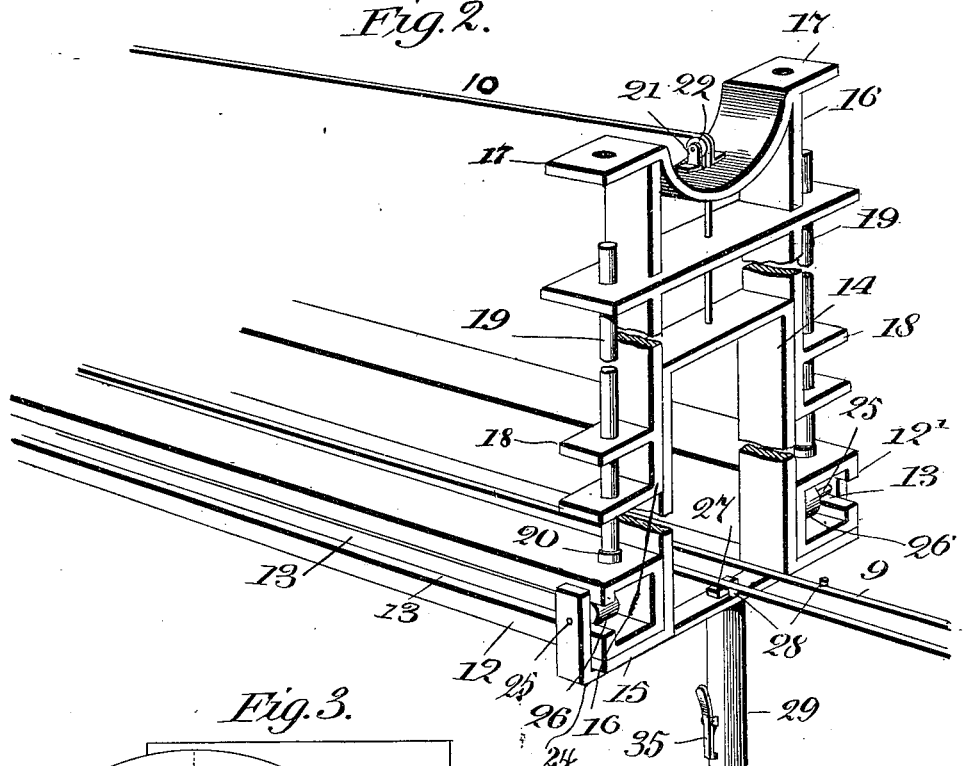
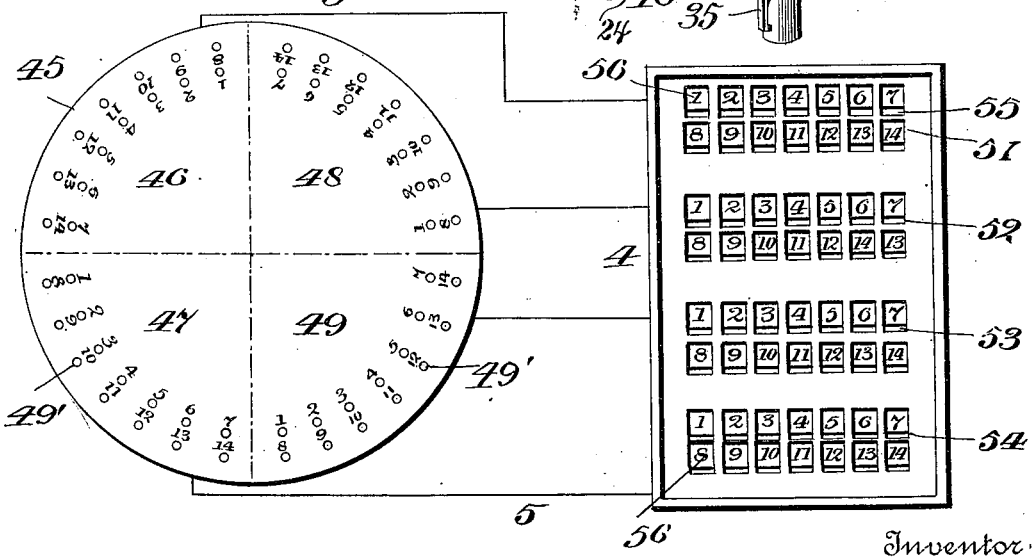
Witnesses
L. C. Hills.
A. L. Bogan
Inventor
James Doyle,
by N. C. Evert & Co.
Attorneys

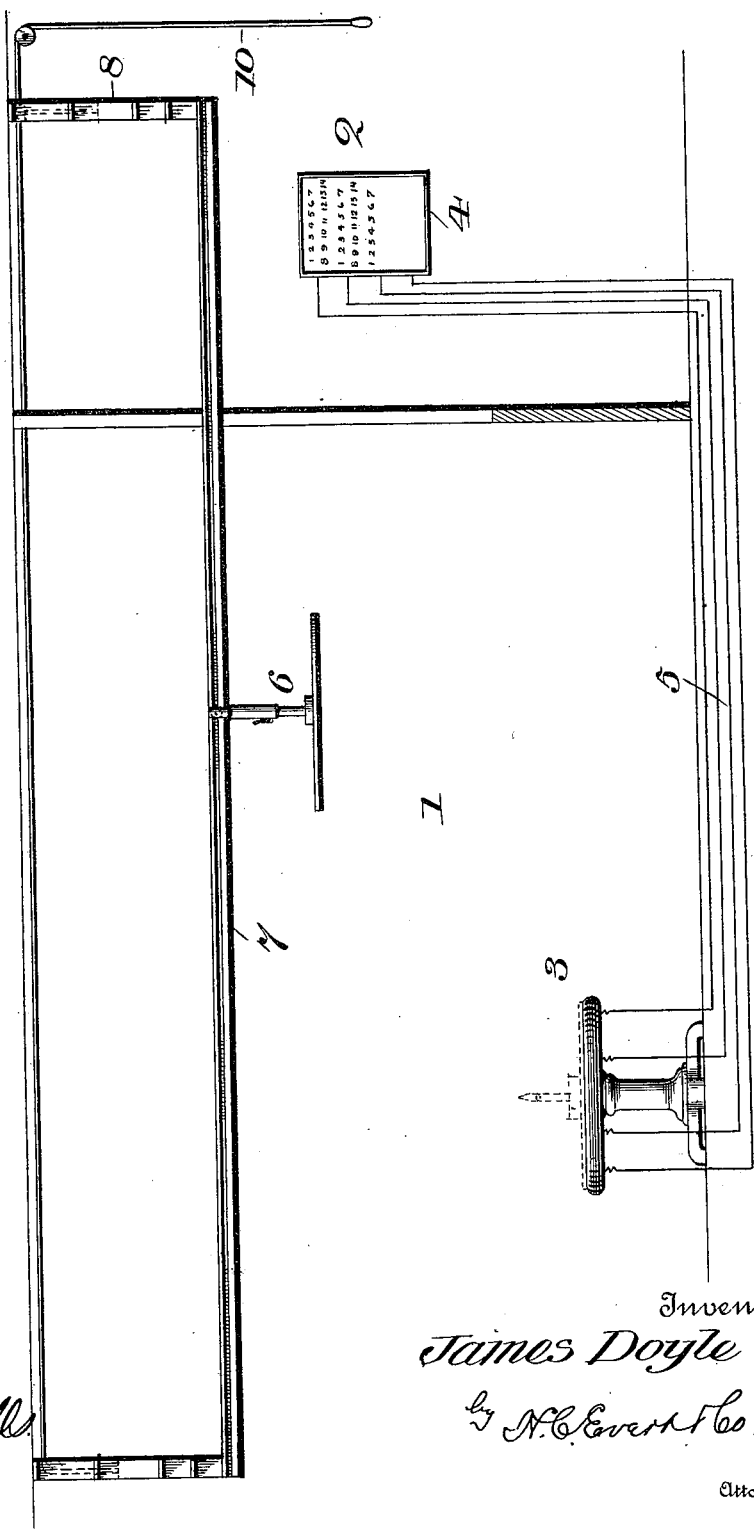

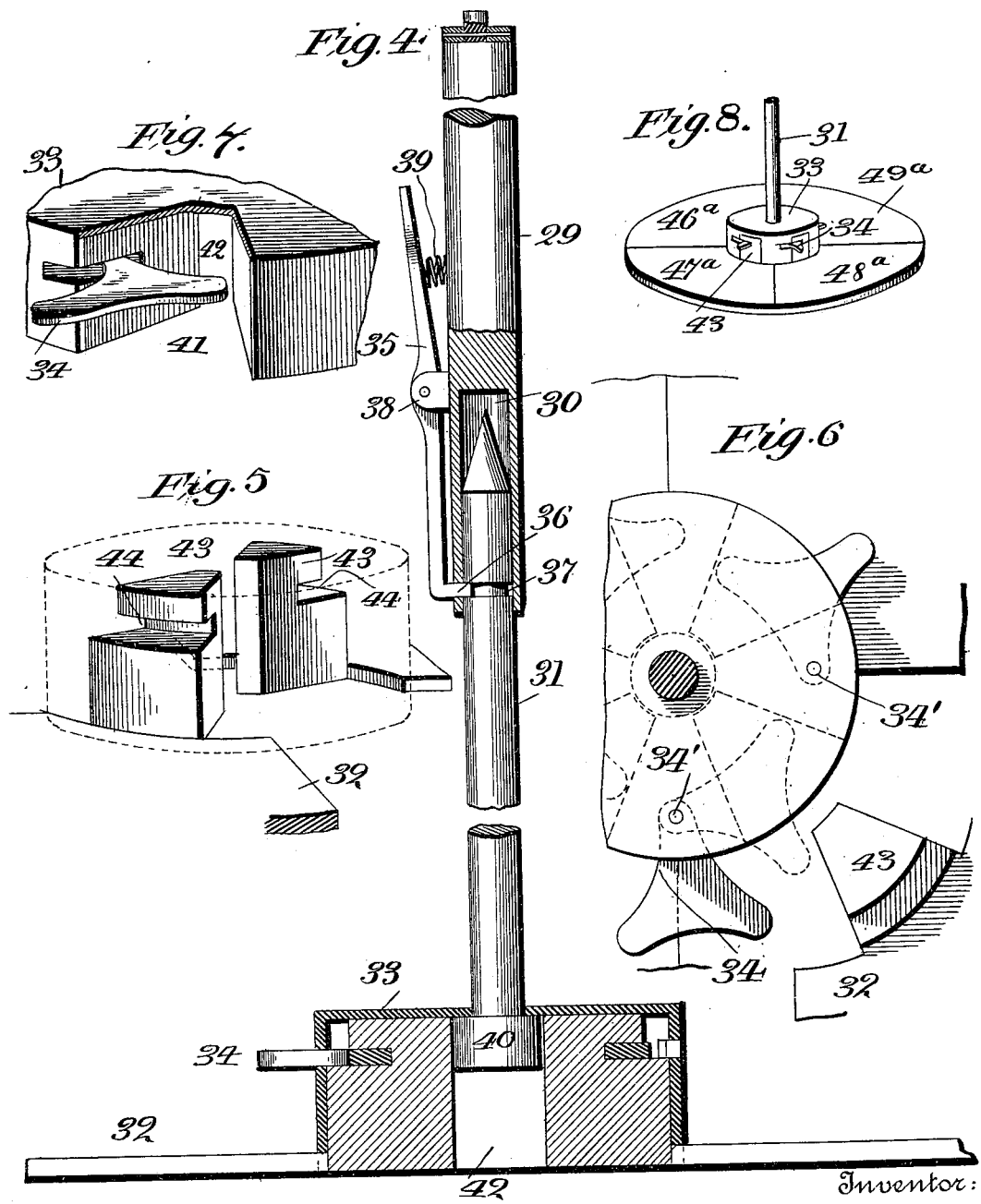

UNITED STATES PATENT OFFICE.

JAMES DOYLE, OF PITTSBURG, PENNSYLVANIA.

SERVING APPARATUS FOR DINING-ROOMS.

SPECIFICATION forming part of Letters Patent No. 659,057, dated October 2, 1900.

Application filed December 15, 1898. Serial No. 699,400. (No model.)

*To all whom it may concern:*

Be it known that I, JAMES DOYLE, a citizen of the United States of America, residing at Pittsburg, in the county of Allegheny and State of Pennsylvania, have invented certain new and useful Improvements in Serving Apparatus for Dining-Rooms, of which the following is a specification, reference being had therein to the accompanying drawings.

My invention relates to certain new and useful improvements in serving apparatus for dining-rooms.

One object of my invention is to construct an apparatus of this character for serving a guest in the dining-room by dispensing with the usual waiters.

A further object of my invention is to provide means by which a guest can indicate the food desired to a chef, and which consists of a suitable indicator arranged in the kitchen and connected to the dining-table and which is operated by a series of push-buttons arranged in the dining-table.

A further object of my invention lies in my improved carrier for serving the food desired, which has been ordered by the guest by means of the indicator.

My invention finally consists in the novel combination and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1 is a vertical longitudinal sectional view of my improved apparatus. Fig. 2 is a perspective view of one of the brackets for supporting the track and dumb-waiter. Fig. 3 is a top plan view of my improved dining-table, showing the same connected to an annunciator. Fig. 4 is a side elevation, partly in section, of my improved dumb-waiter. Fig. 5 illustrates a perspective view in full and dotted lines, showing the end of the dumb-waiter sections arranged in the securing-collar. Fig. 6 illustrates a top plan view of the dumb-waiter, showing in dotted and full lines the clamp for securing the sections of the dumb-waiter together. Fig. 7 is a perspective view, partly broken away, of the collar to which are secured the carrying-sections of the dumb-waiter. Fig. 8 is a perspective view of the dumb-waiter, showing the carrying-section in position.

Referring to the drawings by reference-numerals, 1 indicates the dining-room; 2, the kitchen; 3, the dining-table, connected to the annunciator 4 by means of the wires 5; 6, the dumb-waiter; 7, the track for the dumb-waiter; 8, the supporting-brackets for the track and endless cable 9, and 10 the cord or cable for lowering the track and dumb-waiter.

Referring to Fig. 2 of the drawings, which illustrates one of my improved supporting-brackets and a portion of the track, and in which 12 12' indicate a pair of elongated hollow casings, each provided in its outer side with the elongated slot 13. These casings 12 12' are supported at one end thereof by the adjustable bracket 14, provided at its lower end with the outwardly-extending supports 15, upon which the ends of the casings 12 12' are mounted. 16 indicates the supporting-bracket for the adjustable bracket and within which the bracket 14 is elevated and lowered. The bracket 16 is provided at its top with the outwardly-extending flanges 17 to receive a suitable fastening means for securing the bracket to the ceiling of a room. The bracket 16 is further provided on each side thereof with a series of guides 18, each having an opening arranged therein through which operates the supporting and guide pin 19 for the casings 12 12'. The lower end of this pin is secured to the casings, as at 20. The top of the bracket 16 has arranged therein an opening, and above the same is secured a pair of keepers 21, to which is connected a pulley-wheel 22. The cord or cable 10 operates over the said pulley through the opening in the bracket 16 and is connected to the bracket 14 for elevating or lowering the same. The hanger-arm of the dumb-waiter, to be herein described, is secured to the yoke-shaped hanger 24, which is supported from the casings 12 12' by means of the short shafts 25, each provided with the antifriction-roller 26. These rollers are mounted in the casings 12 12', as shown. The upper face of the hanger 24 is provided with an offset 27, which is engaged by the lugs 28, mounted on the continuous operating cord or cable 9, which is connected to a suitable power means. (Not shown.)

My improved dumb-waiter consists of the hanger-arm 29, suitably secured to the yoke-shaped hanger 24. This hanger-arm 29 is provided in its lower end with a recess 30, adapted to receive the supporting-rod 31, to which the carrying-sections 32 of the dumb-waiter are connected by means of the collar 33 and the clamps 34. The upper end of the rod 31 is retained within the recess 30 by means of the spring-catch 35, having its lower end bent to form a hook 36, which operates through an opening in the arm 29 and engages in an annular groove 37, formed in the rod 31, near the upper end thereof. The catch 35 is pivotally secured to the keepers 38, mounted on the periphery of the arm 29, and has the spring 39, pressing against the same in the manner shown for retaining the hook in position. The lower end of the rod 31 is provided with a head 40 for supporting the collar 33. This collar 33 has arranged therein a series of V-shaped cut-away portions 41 and a centrally-arranged recess 42. The clamps 34 are pivotally connected to the solid part of the collar, as at 34', and operate within V-shaped portions, as shown, and engage the inner end 43 of each carrying-section 32, which are each provided with a substantially V-shaped inner end of the same size as the cut-away portions and have suitably arranged therein a groove 44, in which engages the clamp, and by this means the sections are secured to the collar 33. These sections are substantially quadrant shape, as shown.

The top 45 of my improved dining-table 3 is divided into the sections 46, 47, 48, and 49, and which are provided with a series of push-buttons 49', each button having a suitable number arranged above the same. The buttons are countersunk within the top 45 of the table and connected by suitable wires 5 to an annunciator 4, arranged in the kitchen.

The annunciator 4 is divided into the sections 51, 52, 53, and 54, corresponding in number with the sections of the top 45 of the table, and each section is provided with a series of indicating-disks 55, arranged beneath a series of numbers 56, corresponding with the numbers upon each section of the top of the table arranged above the push-buttons. The object obtained by this arrangement in a dining-table and annunciator is as follows: When a guest desires to order, he examines the bill of fare, in which the articles therein are correspondingly numbered with the push-buttons and which coincide with the numbers and disks of the annunciator. For example, the disks of the indicator are provided with such inscriptions as "Roast beef," "Roast turkey," &c., each disk corresponding with the number upon the bill of fare and upon the table, so that all that the guest does is to push the proper button, and the same will indicate to the chef the article desired.

I divide the table into sections for the purpose of serving as many guests as there are sections, and as illustrated four, which correspond with the number of the carrying-sections 32. These carrying-sections are numbered 46$^a$, 47$^a$, 48$^a$, and 49$^a$ to correspond with the table-sections, so that when an order is filled it is placed on the proper carrying-section of the dumb-waiter, so there will be no mistake in serving the proper guest.

After the order has been filled and the same placed upon the dumb-waiter, which is attached to the hanger-arm 29, the cable 9 is started, and the lug 28, engaging the offset 27, carries the yoke-shaped hanger and dumb-waiter with the cable until the proper table is reached, when the track and dumb-waiter are lowered by means of the cord or cable 10 and the guest served either by removing the order from the dumb-waiter or by removing the section 32 and the order carried thereby.

It is thought that the many advantages of my improved construction can be readily understood from the foregoing description, taken in connection with the accompanying drawings, and it will be noted that various changes may be made in the details of construction without departing from the general spirit of my invention.

Having thus fully described my invention, what I claim as new, and desire to secure by Letters Patent, is—

1. In combination, a track, a dumb-waiter adjustably supported from said track with its receiving-platform comprising a series of removable sections, means for securing said sections together, and means for moving said dumb-waiter along the track to the desired position.

2. In a serving apparatus for dining-rooms, a pair of supporting-brackets, adjustable brackets, means for adjustably connecting the same to the supporting-brackets, a track carried by the said adjustable brackets, a hanger suitably connected to said track, a dumb-waiter suitably connected to said hanger and provided with a series of carrying-sections, an endless cable, and means carried by said cable to engage the adjustable brackets and move the same upon the tracks.

3. In a serving apparatus for dining-rooms, a suitably-supported track, a dumb-waiter provided with a series of numbered carrying-sections, means for connecting said waiter to said track, means for moving said dumb-waiter on said track, in combination with a dining-table divided into a series of numbered sections corresponding with the carrying-sections of the dumb-waiter.

4. In a serving apparatus for dining-rooms, a dumb-waiter consisting of a hanger-arm, a supporting-rod suitably connected thereto, a collar carried by the said supporting-arm and provided with a series of cut-away portions, a series of clamps carried by the said collar, and a series of carrying-sections adapted to be mounted in the said collar and secured thereto by means of the said clamps.

5. In a serving apparatus for dining-rooms, a suitably-supported track, a dumb-waiter provided with a series of numbered carrying-sections, means for connecting said waiter to said track, and means for moving said waiter on said track, in combination with a dining-table divided into a series of numbered sections corresponding with the carrying-sections of the dumb-waiter, and an annunciator connected with the dining-table and divided into a series of numbered sections corresponding with the numbered sections of the said dining-table.

In testimony whereof I affix my signature in the presence of two witnesses.

JAMES DOYLE.

Witnesses:
   JOHN NOLAND,
   H. H. PATTERSON.